United States Patent Office 2,930,732
Patented Mar. 29, 1960

2,930,732

ANESTHETICS

William A. Lott, Maplewood, and Harry L. Yale, New Brunswick, N.J., assignors to Olin Mathieson Chemical Corporation, New York, N.Y., a corporation of Virginia No Drawing. Application May 3, 1957
Serial No. 656,766

4 Claims. (Cl. 167—52)

This invention relates to new anesthetics and more particularly ton an inhalation anesthetic composed of a constant boiling mixture of diethyl ether and trifluoromethylbromochloromethane, a compound of the formula $CF_3CHClBr$.

Prior to this invention there has been a continuous search for a non-inflammable form of diethyl ether for use in general anesthesia, since among all compounds tested as general anesthetics, only diethyl ether fulfills all the tests of a wholly adequate anesthetic, namely, an agent which produces unconsciousness, muscle-relaxation, analgesia, and post-operative amnesia. Ethyl ether, however, suffers the disadvantage of being highly flammable and hence presents a fire hazard in the operation room. Various diluents have been hitherfofore suggested for decreasing the flammability of diethyl ether. These have, however, proved to be inadequate, since they were pharmacologically inactive and hence decreased the effectiveness of the anesthetic, and/or because of their higher boiling point in relation to diethyl ether, by virtue of which they were separated therefrom during administration, by fractional evaporation.

An object of this invention, therefore, is to provide a new anesthetic composition of matter which is non-inflammable and highly effective when used for general anesthesia.

Another object of this invention is the provision of a constant boiling composition which can be accurately meted out as an anesthetic.

These objects are achieved by the composition of this invention which comprises a constant-boiling mixture of diethyl ether and trifluoromethylbromochloromethane.

It has been unexpectedly found that diethyl ether forms a constant-boiling mixture with trifluoromethylbromochloromethane and that such mixture is an effective anesthetic of constant composition and is non-inflammable. This is surprising in view of the fact that diethyl ether and the trifluoromethylbromochloromethane are of dissimilar chemical structure and hence would not be expected to form a constant-boiling mixture; in which case the mixture would be worthless as an anesthetic since upon administration the lower boiling component (e.g. diethyl ether) would be administered first, then a mixture of ever-decreasing amount of the ether would be vaporized and finally substantially pure trifluoromethylbromochloromethane would be administered, thereby rendering it impossible for the anesthetist to pre-determine the amount and nature of the anesthetic being administered and thereby failing to supply the virtues of both components. Furthermore, it has been found that the constant-boiling mixture contains approximately 40 mole percent of diethyl ether to about 60 mole percent of trifluoromethylbromochloromethane, so that the effect of both anesthetics is achieved. By way of contrast, it might be noted that other ethers, such as ethyl vinyl ether, divinyl ether and diisopropyl ether fail to form constant-boiling mixtures with trifluoromethylbromochloromethane, so that diethyl ether may be considered unique among the ethers in this respect. Moreover, if the constant boiling mixture obtained contained say 95 mole percent ethyl ether, then no purpose would be served since the mixture would possess approximately the same physical, chemical and pharmacological characteristics of pure diethyl ether, including the flammability hazard attendant therewith.

Trifluoromethylbromochloromethane is a known substance which has anesthetic properties. It does not, however, possess all of the properties required for a wholly satisfactory anesthetic in that it produces brady-cardia and depression of respiration and does not cause complete muscular relaxation or analgesia [see Bryce-Smith et al., British Medical Journal, 2, 969–972 (1956)]. However, by combining this compound with diethyl ether to form a constant-boiling mixture in accordance with the instant invention, the full effects and advantages of diethyl ether are retained with the resultant obviation of the fire hazard possessed by the latter alone. Furthermore, since trifluoromethylbromochloromethane is itself an anesthetic, the anesthetic action of the diethyl ether is not unduly diluted and the total anesthetic effect of the mixture is not solely that of the diethyl ether component alone. Moreover, the disadvantageous side-effects of the trifluoromethylbromochloromethane are greatly moderated by use in only the amount required to achieve freedom from flammability.

The constant-boiling mixture of this invention can be prepared by the processes of this invention, one of which essentially comprises distilling a mixture of diethyl ether (in about 40 mole percent or greater proportion) and trifluoromethylbromochloromethane (in about 60 mole per cent or lesser proportion) and recovering the constant-boiling mixture obtained thereby. Alternatively, diethyl ether in about 40 mole percent proportion and trifluoromethylbromochloromethane in about 60 mole percent proportion are blended and thus give by this blending, without distillation, a mixture identical in all its physical properties and anesthetic utility with that obtained by distillation.

The following example illustrates the processes of this invention:

*Example*

A distillation pot is charged with 75 ml. of anhydrous diethyl ether and 75 ml. of trifluoromethylbromochloromethane ($CF_3CHBrCl$). The ditsillation pot is then attached to a one-meter long glass-helix packed distillation column and still head. The column is first equilibrated under conditions of total reflux; the still head temperature is 34° C. and the pot temperature is 45° C. The takeoff is then set at the rate of 10 ml. in 35 minutes. The major portion of the distillate is a constant boiling mixture of diethyl ether and trifluoromethylbromochloromethane, B.P. about 52° C. Assay of this constant boiling mixture shows that it contains about 40 mole percent diethyl ether and about 60 mole percent trifluoromethylbromochloromethane.

For use as an anesthetic the mixture of this invention is administered by either the well-known open drop method or by the use of any of the many types of inhaler equipment in general use; as for example, the inhaler of Epstein and Macintosh (1956) calibrated to deliver known concentrations of the anesthetic agent. While the former method is simple and convenient and has certain advantages, the latter method has the advantage of delivering a known and controllable ratio of the azeotropic anesthetic agent to the source of oxygen. The source of oxygen could either be oxygen-nitrogen or oxygen-helium mixtures, or, more commonly, air. Desirably, the anesthetic agent is present in the source of oxygen in a concentration of at least about two percent (vol./vol.).

This invention may be variously otherwise embodied within the scope of the appended claims.

What is claimed is:

1. An inhalation anesthetic composed of a constant boiling mixture of about 40 mole percent of diethyl ether and about 60 mole percent of trifluoromethylbromochloromethane.

2. A method for preparing an inhalation anesthetic which comprises intermixing diethyl ether and trifluoromethylbromochloromethane and recovering the constant boiling mixture obtained thereby.

3. The method of administering an inhalation anesthetic which comprises admixing a constant boiling mixture of diethyl ether and trifluoromethylbromochloromethane with a source of oxygen, wherein the mixture is present in a concentration of at least about two percent.

4. The method of claim 3 wherein the source of oxygen is air.

References Cited in the file of this patent

OTHER REFERENCES

Drug Trade News (Mfg. Sec.), March 25, 1957, p. 78.
Goodman et al.: "Pharmacological Basis of Therapeutics," 2nd ed., 1955, MacMillan Co., N.Y., p. 55.

UNITED STATES PATENT OFFICE

CERTIFICATE OF CORRECTION

Patent No. 2,930,732                                   March 29, 1960

William A. Lott et al.

It is hereby certified that error appears in the printed specification of the above numbered patent requiring correction and that the said Letters Patent should read as corrected below.

Column 1, line 16, for "ton" read -- to --; column 2, line 48, for "ditsillation" read -- distillation --; line 49, for "glass-helix" read -- glass-helice --.

Signed and sealed this 11th day of October 1960.

(SEAL)

Attest:

KARL H. AXLINE                                ROBERT C. WATSON
Attesting Officer                              Commissioner of Patents